(No Model.)

R. FARIES.
REST FOR DISPLAY FRAMES.

No. 398,886. Patented Mar. 5, 1889.

ATTEST
Helen Graham
W. W. Graham

INVENTOR
ROBT. FARIES.
By L. P. Graham
his attorney

UNITED STATES PATENT OFFICE.

ROBERT FARIES, OF DECATUR, ILLINOIS.

REST FOR DISPLAY-FRAMES.

SPECIFICATION forming part of Letters Patent No. 398,886, dated March 5, 1889.

Application filed June 19, 1888. Serial No. 277,601. (No model.)

*To all whom it may concern:*

Be it known that I, ROBERT FARIES, of the city of Decatur, county of Macon, and State of Illinois, have invented certain new and useful Improvements in Rests for Display-Frames, of which the following is a specification.

It is the object of my invention to provide display-frames with cheap and effective rests for shoes, and I attain my object by the means hereinafter set forth and claimed.

Figure 1:
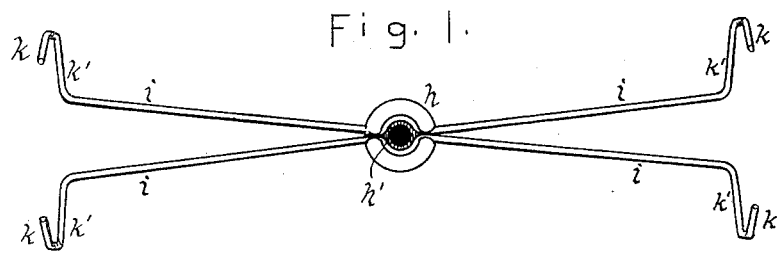
Figure 2:
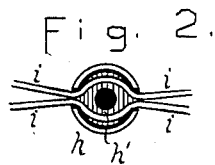
Figure 3:
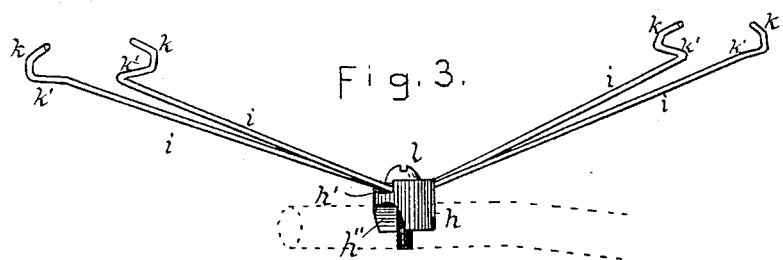

In the drawings accompanying and forming a part of this specification, Figure 1 is a plan of my device. Fig. 2 is a plan of the central portion of the same slightly modified, and Fig. 3 represents the device in perspective.

The saddle $h$ of the rest has a central hole for a securing-screw, a recess, $h'$, concentric with the hole, and opposed notches the same depth as the recess. If the saddle is to be secured to a round bar, it may have the concave depression $h''$ in its under surface, as shown in Fig. 3. The rest comprises two coacting bars, $i\ i$, somewhat elastic, having each a bend adapted to recess $h'$. The bars extend divergently from opposite sides of the saddle, are bent from each other at $k'$ to form rests and upward at $k$ to form clamp-jaws. The bars may be held in the saddle by means of the securing-screw $l$, as shown in Fig. 3, or the surrounding rim may be beaten down over them, as shown in Fig. 1. In either case the central bends form a base that prevents the clamp-jaws from twisting away from each other. The rim holds the bars together. The screw when in place retains the bars in the recess. When the rim is beaten over, the bars will be retained in the recess whether the screw is in position or not.

To place a shoe in a rest, the bars are sprung apart until the heel and sole rest on bends $k'$, when the jaws $k$ are permitted to clamp the shoe on opposite sides of the heel and sole and retain it on the rest. To increase the efficiency of the clamp-jaws, they may be bent toward each other at their ends to any desired extent and in any suitable manner.

I claim as new and desire to secure by Letters Patent—

1. A rest comprising the saddle recessed in its upper surface and the bars, the bars held centrally in the saddle and extended divergently on opposite sides thereof, as set forth.

2. A rest comprising the saddle $h$, recessed in its upper surface, the bars $i\ i$, held centrally in the saddle and extended divergently on opposite sides thereof, and the supporting-surfaces $k'$, formed of the terminations of the bars, as set forth.

3. A rest comprising the saddle having the concave under surface, the bars in the saddle, and the attaching-screw adapted to retain the bars in the saddle and secure the saddle to a frame, as and for the purpose set forth.

4. A rest comprising the saddle $h$, recessed in its upper surface, the bars $i\ i$, held centrally in the saddle and extended divergently on opposite sides thereof, the supports $k'$, and the clamps $k$, both formed of terminations of the bars, as set forth.

5. A rest comprising the saddle and the wires, the saddle recessed in its upper surface and notched to receive the wires, as set forth.

In testimony whereof I sign my name in the presence of two subscribing witnesses.

ROBERT FARIES.

Attest:
GEO. A. HENDERSON,
L. P. GRAHAM.